(12) United States Patent
Kurowski

(10) Patent No.: US 7,279,030 B2
(45) Date of Patent: Oct. 9, 2007

(54) DISTRIBUTOR FOR ROTARY FILTER AND ROTARY FILTER EQUIPPED THEREWITH

(75) Inventor: Serge Kurowski, Neuville-en-Condroz (BE)

(73) Assignee: Gevers & Vander Haeghen SA (BE)

( * ) Notice: Subject to any disclaimer, the term of this patent is extended or adjusted under 35 U.S.C. 154(b) by 397 days.

(21) Appl. No.: 10/530,162

(22) PCT Filed: Oct. 2, 2003

(86) PCT No.: PCT/BE03/00165

§ 371 (c)(1),
(2), (4) Date: Apr. 4, 2005

(87) PCT Pub. No.: WO2004/030791

PCT Pub. Date: Apr. 15, 2004

(65) Prior Publication Data

US 2006/0162567 A1   Jul. 27, 2006

(30) Foreign Application Priority Data

Oct. 4, 2002   (BE) ................................. 2002/0574

(51) Int. Cl.
*B01D 19/00* (2006.01)
(52) U.S. Cl. ........................... 96/189; 96/197; 96/206; 210/328; 95/258

(58) Field of Classification Search .................. 96/189, 96/197, 188, 206; 95/258, 262, 266; 210/328
See application file for complete search history.

(56) References Cited

U.S. PATENT DOCUMENTS 4,330,404 A * 5/1982 Davister ..................... 210/247
5,298,057 A   3/1994 Burt

FOREIGN PATENT DOCUMENTS

BE           847 088 A    1/1977
EP         0 175 702 A    4/1986

* cited by examiner

*Primary Examiner*—Duane Smith
*Assistant Examiner*—Douglas J. Theisen
(74) *Attorney, Agent, or Firm*—Michael Best & Friedrich LLP

(57) ABSTRACT

A rotary filter is disclosed, comprising filtering cells rotating in a circular movement, including a fixed collector portion comprising at least two compartments each having arc-shaped upward opening and a central separator chamber, including a downward opening communicating the separator chamber with each of said compartments, said downward opening being arranged at a level lower than said upward opening of each of the compartments, the downward opening of the central separator chamber and the upward opening of each compartment of the collector portion partly overlapping in vertical projection.

6 Claims, 3 Drawing Sheets

DISTRIBUTOR FOR ROTARY FILTER AND ROTARY FILTER EQUIPPED THEREWITH

This application claims the benefit of International Patent Application No. PCT/BE2003/00165 filed Oct. 2, 2003, which claims priority of Belgian Patent Application No. 2002/0574, filed Oct. 4, 2002.

BACKGROUND

A distributor for a rotary filter comprising filtration cells rotating in a circular movement is disclosed. Known distributors include:

a fixed collector part comprising at least two compartments, which each have an upward opening in the form of an arc of a circle and at least one liquid discharge pipe, and a central separator chamber, which comprises a downward opening putting the separator chamber in communication with each of the said compartments and a gas outlet pipe, the said downward opening being disposed at a level lower than the said upward opening of each of the compartments, a movable distributor part which slides over the collector part during the said circular movement and which comprises, per filtration cell, an alveolus having an inlet for receiving a filtered liquid/gas mixture coming from the filtration cell and an outlet which passes opposite the said arc-shaped opening in each of the said compartments during the said circular movement, thus allowing passage of the said mixture in the said collector part, and means for putting the separator chamber under negative pressure, so as to cause a separation of gas from the liquid/gas mixture flowing in the said compartments of the collector part, with an upward movement of the gas in the separator chamber from its downward opening.

Such distributors are known and described for example in the patents BE-A-847088 and EP-B-0 175 702.

These devices therefore permit a separation of the gases existing in the liquid/gas mixture forming the separate filtrate in the filtration cells by the arrangement of a central separator chamber into which the gases are drawn.

However, the drawn-in gases entrain with them liquid droplets which must separate by gravity from the gases during the upward movement of the latter which is obtained in the central separator chamber. To do this, the upward speed of the gases at the entry to the separator chamber must preferably be limited in order to increase the efficacy of the separation of the droplets, and therefore the downward opening of the central separator chamber must have a minimum cross section, according to the flow rate of the filtrate reaching the fixed collector part of the distributor.

The drawback of such distributors is that, given this minimum cross section of the central separator chamber, they have an unfavourable overall bulk at the middle of the rotary filter, which results in a greater consumption of friction energy and an additional cost of making the apparatus.

SUMMARY

The distributor disclosed here for a rotary filter allows effective separation between liquid and gas in the filtered mixture coming from the filtration cells of the rotary filter, whilst offering the advantage of reduced bulk.

In vertical projection, the downward opening of the central separator chamber and the upward opening of each compartment of the collector part of the distributor described here overlap partially. Therefore, in the fixed collector part, instead of juxtaposing a central separator chamber at the centre of the compartments, the distributor provides a central separator chamber which projects downwards below the arc-shaped upward openings of the compartments. The result is an acknowledged reduction in the bulk of the distributor overall, in order to obtain an at least identical if not increased efficacy of the liquid/gas separation in the filtered mixture.

According to a preferred embodiment, the central separator chamber has an external peripheral wall which, at least at a level situated below each upward opening, extends so as to be inclined downwards and towards the outside and thus forms, in the said compartments, a deflector which diverts the liquid/gas mixture towards the outside of these in a first direction and allows a separation of the gas from this mixture in a second direction oriented at 180° with respect to the first direction. The liquid/gas mixture coming from the alveoli of the movable distributor part bounces on the deflector in a direction oriented obliquely downwards and outwards. The gases are on the other hand drawn into the central chamber whilst being oriented by the deflector obliquely upwards and towards the top of the central chamber, that is to say at 180° with respect to the direction of the liquid phase. The efficacy of the liquid/gas separation is thus improved by a pre-separation due to the impact on the deflector, followed immediately by a reversal of the direction of flow of the gases at 180°.

Other embodiments of the distributor are indicated in the accompanying claims.

Other details and particularities of the distributor will emerge from the description given below, non-limitingly and with reference to the accompanying drawings.

DESCRIPTION OF THE DRAWINGS

In the various drawings, the identical or similar elements are designated by the same reference numbers.

Although the present description applies particularly to the example of continuous rotary filters with cells, preferably tiltable, the distributor is not limited to these continuous rotary filters but applies in general to distributors of vacuum rotary filters with a substantially horizontal filtration surface of other types.

The filters in general comprise a series of filtration units commonly referred to as "cells", which undergo separately, in a discontinuous fashion, the successive operations of filtration, washing, various special treatments, discharge of the cake formed on the filtering surface, washing and drying of the cells and of the filtering cloth. All these various operations are reproduced in the course of each of the movement cycles, all the cycles constituting a continuous overall process, integrated in a filtration line.

Figure 1:
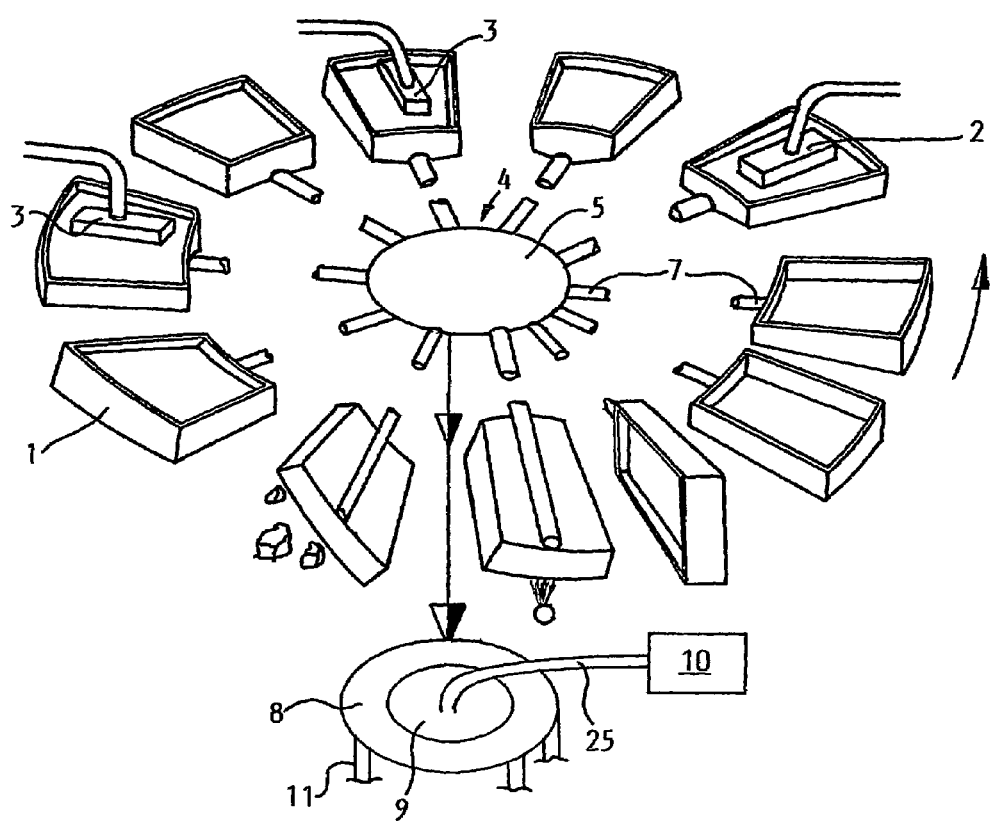
FIG. 1 depicts a general schematic view of a rotary filter provided with a distributor.

An example of such a filtration line is shown diagrammatically in FIG. 1. Such a filter essentially comprises:

a) a known rotating frame, not shown, which carries cells 1 by means of bearings, and drives these cells in the circular movement indicated by the arrow, b) a drive unit, not shown, which transmits a rotation movement to the rotating frame, for example by means of a toothed rack, c) known guide levers for the cells 1 carrying rollers which roll on rails attached to a peripheral framework known per se. These levers drive the cells in their tilting movement, which can be seen in FIG. 1, d) distribution troughs 2 and 3, suspended from the framework above the cells and which distribute in the latter the slip to be filtered and the washing liquors, e) a central distributor 4 consisting essentially, firstly, of a rotating circular distributor head 5, which comprises alveoli 6 disposed in a circle, connected respectively to the cells 1 by flexible tubes 7, and which rotates jointly with the frame and the cells 1, and, secondly, a fixed collector base 8, which comprises chambers and compartments delimited by partitions, the rotating distributor head 5 sliding in rotation on the fixed collector base 8 by means of a fluidtight planar friction seal.

The distribution troughs, situated in correspondence with the partitions, delimit successive filtration and washing sectors, the liquids and gases which have passed through the filter beds of the cells of each of these sectors being collected in separate compartments.

The fixed collector base 8 also comprises, centrally, a separator chamber 9 in which the gases are drawn in and discharged by a means 10 putting the separator chamber 9 under negative pressure, whilst, by gravity, the liquids are collected in discharge pipes 11.

The example embodiments illustrated in FIGS. 2 to 5 have been shown schematically solely to the extent of 50%, since the other half is either entirely identical or has differences without significance, for example with regard to the part of the collector base situated facing a section of the rotating filter without filtration or washing.

Figure 2:
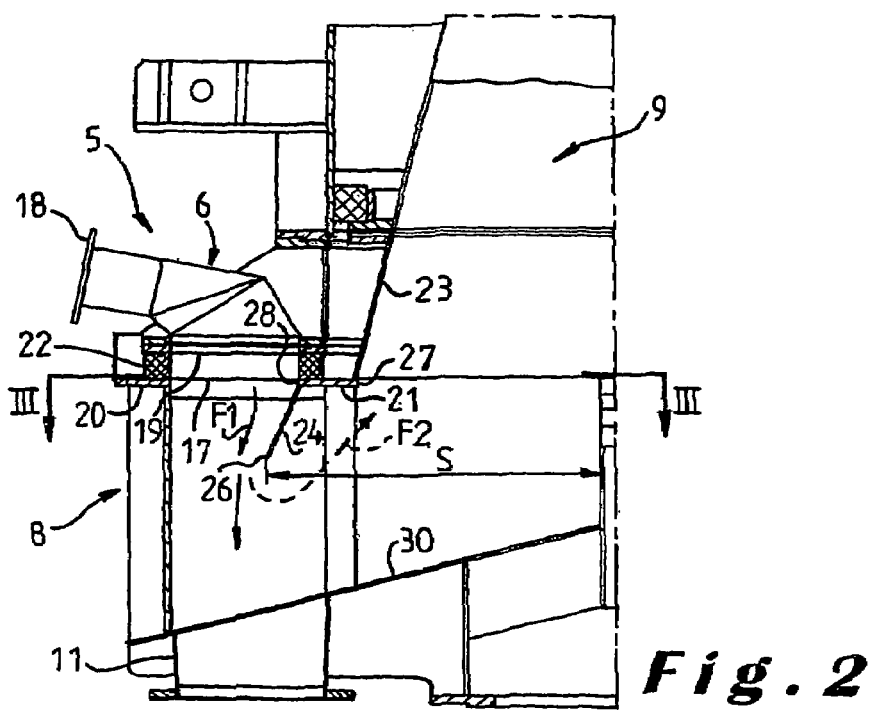
FIG. 2 depicts a view in partial axial section of a distributor described herein, along the line II-II in FIG. 3.
Figure 3:
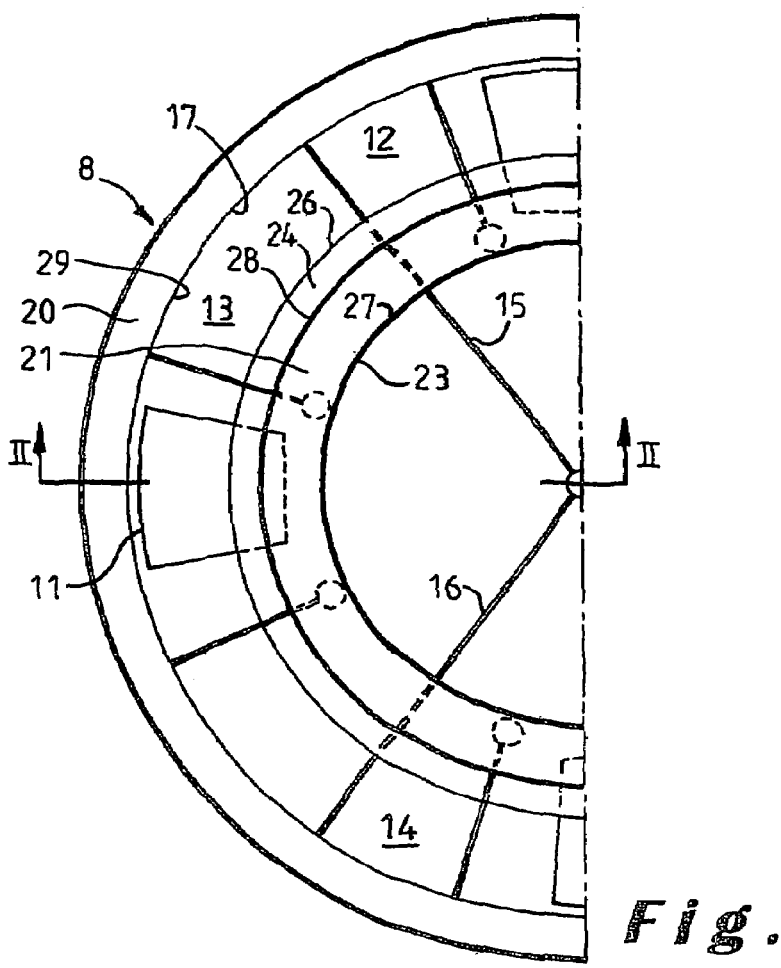
FIG. 3 depicts a view in partial longitudinal section of the distributor according to FIG. 2, along the line III-III.

The distributor according to FIGS. 2 and 3 comprises a fixed collector base 8 having at least three compartments 12, 13 and 14 mutually separated by radial partitions 15 and 16. These compartments can for example correspond to various steps of the process: filtration, first washing, second washing, etc. In the example illustrated, the collector base has an opening towards the top in the form of an arc of a circle 17 which covers all the compartments 12 to 14 and which is also sub-divided by the radial partitions 15 and 16. Each compartment 12 to 14 also has a liquid discharge pipe 11 disposed at the bottom in order to receive the liquids, under the effect of gravity and possibly suction performed in a manner known per se in these pipes 11.

The movable distributor head 5 comprises as many alveoli 6 as there are filtration cells. In FIG. 2, only one alveolus is shown. It has an inlet opening 18, to which there can be connected in a sealed fashion a flexible tube 7 coming from one of the cells, and an outlet 19 which is directed downwards. The distributor head is provided, with the exception of the locations where an outlet 19 is situated, with a friction seal 22 which, during the movement of the distributor head, slides on the horizontal rims 20 and 21 disposed on each side of the opening 17 of the collector base 8.

At the centre of the collector base, there is also provided a central separator chamber 9. This chamber, in the example embodiment illustrated in FIGS. 2 and 3, has a frustoconical peripheral wall 23 which delimits the cross section of flow of the gases upwards from the internal peripheral edge 27 of the horizontal rim 21, and which is extended, below the level of the opening 17, by a deflector 24 in the form of a skirt which projects and extends so as to be inclined downwards and towards the outside from the external peripheral edge 28 of the horizontal rim 21.

The central separator chamber 9 thus has a circular opening towards the bottom, delimited by the free end 26 of the deflector 24. It has in this example an open annular section of width S. In this example embodiment, the separator chamber leads in the direction from the top towards a gas discharge pipe 25 (see FIG. 1) through which the means 10 for putting the separator chamber 9 under negative pressure suck the gases out of this chamber.

As is clear from FIG. 3, in vertical projection, the opening towards the bottom of the separator chamber 9, which is delimited by the free end 26 of the deflector 24, and the opening towards the top 17 of the collector base, which is delimited by the external peripheral edge 28 of the horizontal rim 21 and by the internal peripheral edge 29 of the horizontal rim 20, are partially superimposed.

The functioning of this distributor is as follows:

During filtration, the collector head 5 accompanies the circular movement of the cells rotating in a carousel around the distributor. Each alveolus 6, connected to the tube 7 of a cell, thus collects the filtrate coming from its cell, which is composed of a mixture of liquid and gas. For reasons known to persons skilled in the art, it is advantageous to effectively separate the gases and liquids and to collect these separately.

During the rotation of the distributor head 5, each alveolus slides sealingly over the rims 20 and 21 of the collector base and is therefore situated successively opposite the upward opening 17 of each compartment, distributing the filtered mixture received in the corresponding compartment.

During this distribution, the filtered mixture abuts against the deflector 24 and is diverted obliquely downwards and towards the outside of the compartment in the direction indicated by the arrow F1.

At the bottom of the deflector, the filtered mixture is subjected to the negative pressure which prevails in the central separator chamber 9 and the gases present in the filtered mixture are sucked into this in a direction F2 oriented directly at 180° with respect to the direction F1, that is to say directly in an upward movement, without transition through a horizontal passage. The liquids on the other hand continue their fall downwards in the discharge pipe 11. Not only does a pre-separation of the gases and liquids at 180° occur at the deflector, which improves the separation, but the annular surface of width S of the base opening of the separator chamber 9 is simultaneously kept sufficiently large for the upward speed of the gases to be limited. This limitation in fact allows more effective precipitation of the droplets of liquid inevitably entrained in the sucked gases. These droplets, falling onto the inclined surface 30, are also collected in the pipes 11.

The gases, free from water droplets, are finally sucked through the top of the separator chamber 9, which opens out in the discharge pipe 25.

This arrangement therefore simultaneously affords greater efficacy of separation between liquid and gas through a width of downward opening of the central separator chamber which is as large or even larger than the distributors of the prior art, and through a 180° reversal of the gas stream, without passing through horizontal gas flow steps. At the same time it makes it possible to obtain compact equipment.

It is in fact possible to provide a compact distributor having an outside diameter of around 2.700 mm. Such a distributor can be arranged in a rotary filter having for example a useful surface of 230 m2 and a weight of 9.2 t.

A conventional distributor generally has an outside diameter of around 3.140 mm. A more bulky distributor of this type may equip filters with a less large but useful surface, for example of 180 m2, and a weight of 12 t, for the same overall size.

Figure 4:
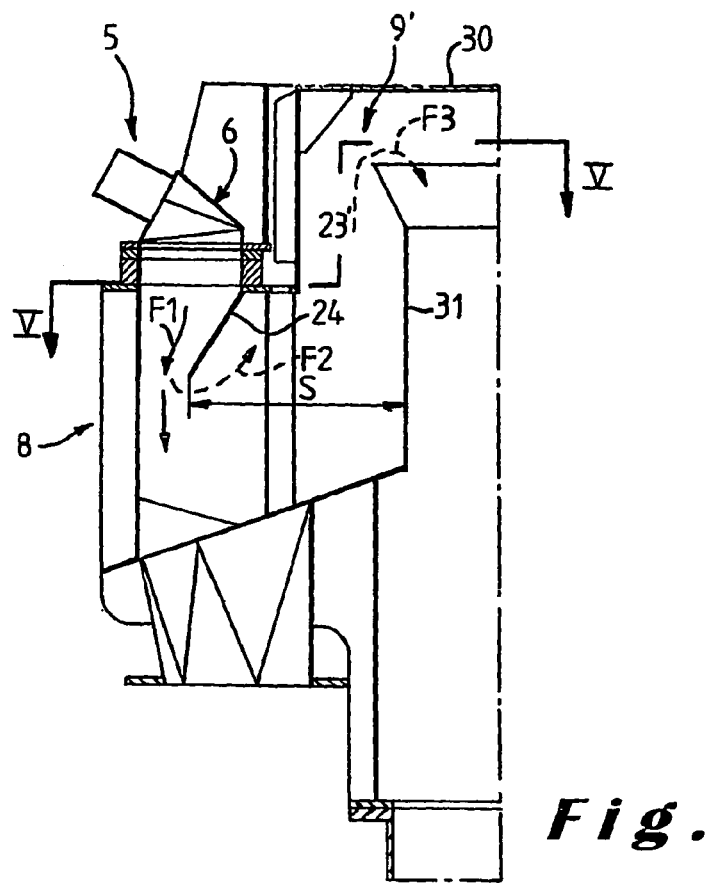
FIGS. 4 and 5 are views similar to FIGS. 2 and 3 of another embodiment of the distributor.
Figure 5:
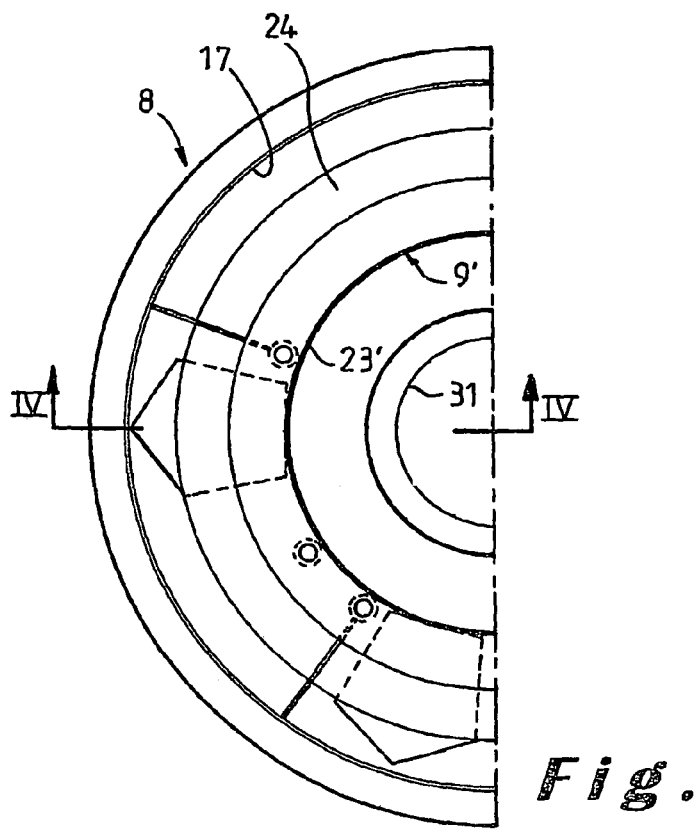

The distributor illustrated in FIGS. 4 and 5 is another embodiment.

It differs from the example embodiment according to FIGS. 2 and 3 through the central chamber 9'.

The central chamber 9' has here the form of an inverted pot whose peripheral wall 23' is cylindrical. The top of the chamber 9' is closed off by a cover 30. At the centre of the central chamber there is arranged a nozzle 31 which is splayed and open towards the top and which communicates with the gas discharge pipe. At this point, the gases freed from the liquid droplets undergo a new reversal in the direction of flow, in accordance with the arrow F3. They are therefore sucked downward in the nozzle 31.

It must be understood that the present distributor is in no way limited to the embodiments described above and that many modifications can be made thereto without departing from the scope of the accompanying claims.

The invention claimed is:

1. Distributor for a rotary filter comprising filtration cells rotating in a circular movement, comprising
   (a) a fixed collector part comprising at least two compartments, which each have an upward opening in the form of an arc of a circle and at least one liquid discharge pipe, and a central separator chamber, which comprises a downward opening putting the separator chamber in communication with each of the compartments and a gas discharge pipe, the said downward opening being disposed at a level lower than the upward opening of each of the compartments,
   (b) a movable distributor part which slides over the collector part during the said circular movement and which comprises, per filtration cell, an alveolus having an inlet for receiving a filtered liquid/gas mixture coming from the filtration cell and an outlet which passes opposite the arc-shaped opening in each of the compartments during the circular movement, thus allowing passage of the mixture in the collector part, and
   (c) means for putting the separator chamber under negative pressure, so as to cause a separation of gas from the liquid/gas mixture flowing in the said compartments of the collector part, with an upward movement of the gas in the separator chamber from its downward opening, characterised in that, in vertical projection, the downward opening of the central separator chamber and the upward opening of each compartment of the collector part overlap partially.

2. Distributor according to claim 1, characterised in that the central separator chamber has an external peripheral wall which, at least at a level situated below each outlet opening, extends so as to be inclined downwards and towards the outside and thus forms, in the compartments, a deflector which diverts the liquid/gas mixture towards the outside of these in a first direction and allows a separation of the gas from this mixture in a second direction oriented at 180° with respect to the first direction.

3. Distributor according to claim 1, characterised in that each upward opening in the form of an arc of a circle has an external peripheral edge and an internal peripheral edge and in that the said deflector is a plate in the form of a skirt fixed to the internal peripheral edge of each of the said upward openings.

4. Device according to claim 1, characterised in that the gas discharge pipe is arranged at the top of the central separator chamber.

5. Device according to claim 1, characterised in that the central separator chamber is closed towards the top and in that the gas discharge pipe is arranged centrally with an inlet at the top of the separator chamber and an outlet towards the bottom.

6. Rotary filter comprising a distributor according to claim 1.

* * * * *